Oct. 6, 1936.  G. A. F. MACHLET  2,056,285
ELECTRIC REGULATOR FOR FURNACES AND OTHER APPARATUS
Filed July 14, 1933  2 Sheets-Sheet 2
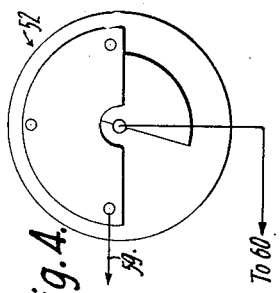
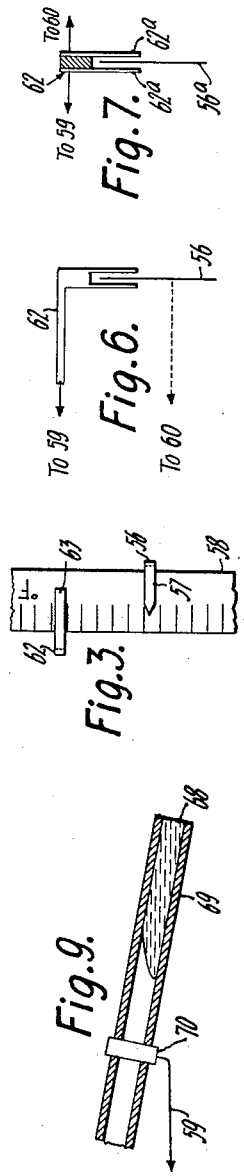
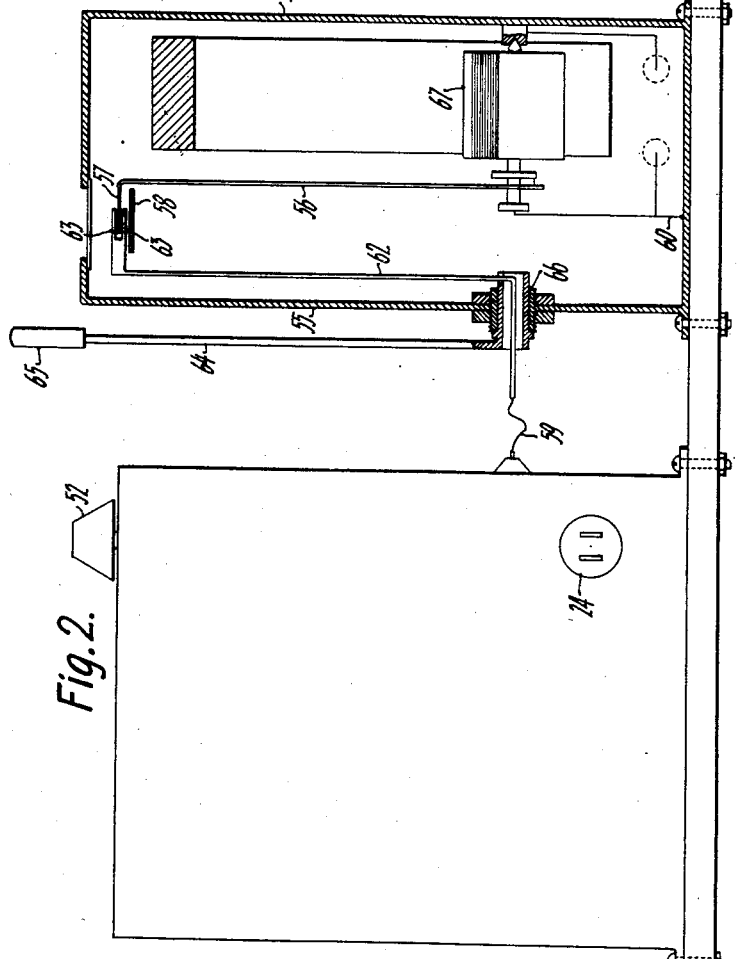
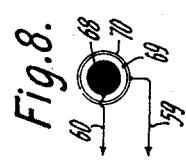
Inventor:
George A. F. Machlet
by D. B. Stickney
Attorney.

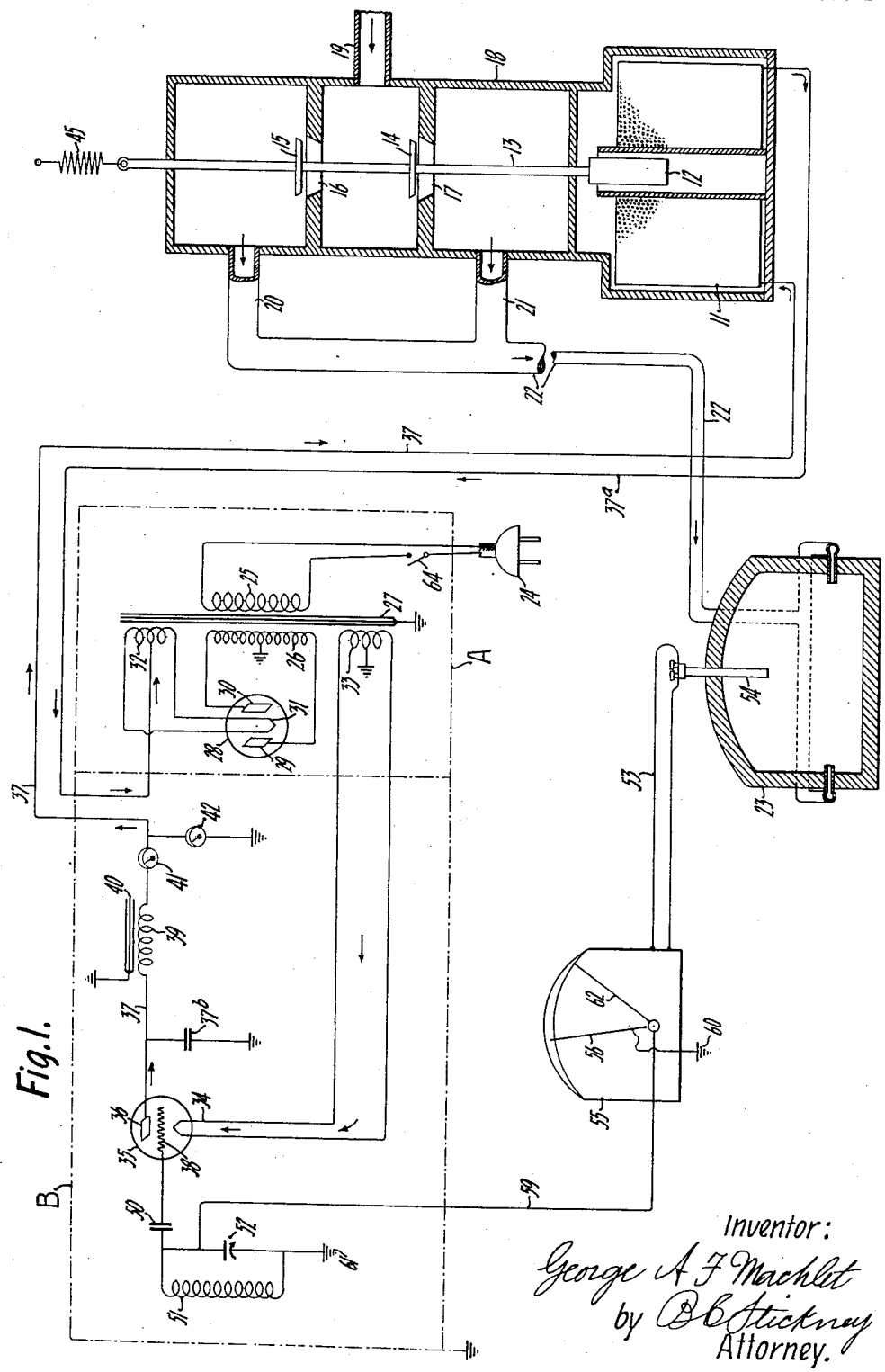

Patented Oct. 6, 1936

2,056,285

UNITED STATES PATENT OFFICE 2,056,285

ELECTRIC REGULATOR FOR FURNACES
AND OTHER APPARATUS

George A. F. Machlet, Elizabeth, N. J.

Application July 14, 1933, Serial No. 680,494

28 Claims. (Cl. 236—69)

REISSUED
FEB 6 - 1940

Automatic control-devices which are stepless and proportional have been limited to applications where the measuring or indicating device is quite rugged, and where considerable power for the control's operation is available. It is a feature of this invention to effect regulation by use of a novel highly sensitive measuring device, such as, for example, a pyrometer, for effecting whose action only a weak electric current is available. It is contrived to utilize the delicate actuating member of a sensitive instrument, for effecting delicate regulation of a working apparatus, such, for example, as a furnace or heater, but without retarding the movement and thereby detracting from the sensitiveness of the indicating member. The object in imposing no work upon the automatic controlling device, is to insure delicacy and precision of its action. Heretofore it has been the practice to set a point which was reached by an overadvance of the controlling device, at which point a reversal was effected. Another point was set for limiting the ensuing reverse travel of the controlling device. The latter continually vibrated or stepped to and fro between those points. By means of the present improvements, the automatic controlling or determining device may move from an idle position to the exact point desired, and there settle and remain motionless or substantially so, throughout the operation of the work-apparatus, not stepping either up or down therefrom.

The heat of a furnace for example, may be accurately and steadily maintained at any desired point. Fluctuation of its heat may be substantially eliminated, as the automatic regulator will promptly settle at the point at which the precise necessary flow of fuel will be supplied to the furnace, without liability to the continual overheating and underheating effects which are commonly due to the fluctuations of standard heat-controllers.

Equivalent advantages are obtainable from the invention in many other instances where it is desired to effect effortless and delicate regulation; the invention by no means being limited to heat-controlling apparatus.

By employing a condenser-device, this invention provides that a moving member of a measuring instrument, such as the needle of a pyrometer for example, shall produce electrical capacity variations proportional to the movements of said member. The usual graduated scale of a pyrometer or other instrument may or may not be present, as the advantage of the automatic control can be realized even though there is no scale used for co-operation with the needle. By the employment of a suitable electric indicating circuit, these capacity variations are caused by the novel automatic controller to effect proportional variations in consumption or flow of an electric current in a separate novel controlling circuit, the variations being due to fluctuations in the condition of the major or work apparatus to which said indicating circuit is connected. The current fluctuations in the controlling circuit may be utilized to govern or control the condition of such major apparatus, and also to record the fluctuations if desired.

How these proportional capacity variations are utilized to effect proportional and stepless control and preferably recording of the condition indicated by the indicating instrument, will be explained in the following description of a typical application of this control principle.

In the preferred form of the invention, there is utilized as one element, a conventional variable condenser of the type generally employed for tuning a radio-receiver to the desired frequency, and consisting of a rotor-set and a stator-set of condenser-plates, which are mounted in a manner permitting the rotor to be rotated while the stator remains stationary. As the rotor is turned, its plates advance into, or recede from, the spaces between the plates of the stator, without, however, effecting contacts with these plates. Since the capacity of this main condenser is determined partly by the overlapping or effective areas of the plates, it can be readily seen that the capacity of the condenser is determinable solely by the relation of the rotor-plates to the stator-plates, since all other capacity-affecting factors ordinarily remain constant.

With the aforesaid main condenser there is associated, to gain the desired results, an auxiliary condenser. The latter is used in conjunction with the pyrometer or other indicator device and the furnace or any other apparatus or device that it is desired to control. The auxiliary condenser has a stator and a rotor. The rotor, in the present illustration, may consist of the indicating needle of a galvanometer that forms part of a pyrometer-train. The auxiliary condenser-device may have comparatively little capacity, and is tuned automatically. The main condenser may be regulated or tuned manually.

To be specific, the indicating needle (or its equivalent) of a galvanometer or other sensitive indicating instrument, is made to serve as a rotor, being adapted to pass between plates of a small stator, the latter consisting of the tines of an electrode that is constructed in the form of a fork. The indicating needle, together with the electrode, may actually constitute an auxiliary variable condenser, since the electrode represents the auxiliary stator-plates, while the indicating needle may represent the auxiliary rotor.

It is quite obvious then, that when the indicating needle hovers in the proximity of the electrode, responsive to fluctuations in the pyrometer-circuit, it is automatically varying the capacity of the variable condenser of which it is a part, in proportion to the extent of its movement. Since it at no time touches the electrode, the needle is not obstructed, and it follows that the needle may, if desired, perform its usual indicating function. In any case, the needle or coil of the instrument is not mechanically affected or retarded.

The main condenser, taken together with the auxiliary condenser, forms a control-element, which is subject to fluctuations due to the movements of the galvanometer-needle in proximity to the auxiliary stator. The fluctuations of the needle affect the capacity of the auxiliary condenser (the rotor of the main condenser remaining motionless), and the rate of oscillation of the circuit in which it is incorporated is increased or diminished accordingly, thus increasing or diminishing the rate of consumption of electric current jointly controlled by the condensers, and automatically causing reduction or increase in the flow of fuel to the furnace, or corresponding change in other major apparatus.

It will be understood that a thermo-couple is inserted in the furnace, to enable variations in the heat of the furnace to set up fluctuations in the electric current passing through the temperature-indicating galvanometer having a coil, and that the galvanometer is employed in controlling the heat of the furnace automatically; the galvanometer-needle being connected to means for increasing or diminishing the fuel-supply to the desired point, and then maintaining a uniform flow, as may be required, in order to keep the furnace at a steady heat.

The galvanometer-needle (independently of the usual scale) for this purpose is utilized for performing the function of varying the capacity of the condenser-element of an electric oscillator. Fluctuations in the rate of oscillation are caused to modify the rate of flow of fuel to the furnace. Instead of a heat-producer, the invention may be used for regulating other producers, as for example dynamos, and the variations in the condition of the producer may be utilized for the automatic regulation thereof. It is also available for regulating non-productive major apparatus.

Other features and advantages will hereinafter appear.

In the accompanying drawings,

Figure 1 is a sectional elevational diagram representing a gas-furnace whose temperature is being regulated by the present invention; the air-valve being open and the furnace warming up to the point set by the stator of the auxiliary condenser; the needle being in motion from idle position toward said auxiliary stator.

Figure 2 is a part-sectional diagram in side elevation, showing the position at which the regulator maintains the furnace at a predetermined heat.

Figure 3 is a fragmentary plan of the tips of the needle and the co-operative stator.

Figure 4 illustrates the connections of the stator and rotor of the main condenser.

Figure 5 is a plan of the condenser seen at Figure 4.

Figure 6 shows a modified form of automatic condenser-elements.

Figure 7 shows a needle made of material not serviceable for the plate of a rotor; the stator having plates insulated from each other and each suitably electrically connected for the purpose.

Figures 8 and 9 show sectional and side views of the use of a liquid indicator, the indicator moving to and from a position between the condenser-plates, to effect automatic regulation.

There is shown in the drawings means for effecting automatic regulation of the heat of a gas-furnace, for example, the flow of fuel to the furnace being controlled by an electrically-operated air-valve.

The circuit through which flows the valve-controlling electric current that is to be automatically regulated, includes a solenoid 11, whose core 12 may pull down a spring-lifted valve-rod 13, having balanced valves 14, 15, to close ports 16, 17 in a chest 18, which is supplied with air through a pipe 19, and which delivers a delicately regulated flow of air through outlets 20, 21, to a conduit 22 running through a fuel-injector (not shown) to a furnace 23; the injector having the usual provision for mixing compressed air with the fuel-gas. The furnace and the solenoid are here used for the purpose of illustration, as the invention is applicable to regulating an electric current for a variety of purposes.

Although power could be obtained from batteries, it is preferred to utilize current supplied by the local electric-light line, through plug 24. However, since this is generally an alternating 60-cycle current of 110 volts, it is first necessary to transform it to the proper voltage for a filament-supply. It is further necessary to convert it into direct current of proper voltage for the plate-supply of a vacuum tube. This is accomplished by connecting plug 24 to the primary coil 25 of a 3-secondary transformer, having a grounded core 27, in a circuit diagrammatically enclosed in the dotted area A. A current of higher voltage is obtained in secondary coil 26. A rectifier-tube 28 contains opposite plates 29, 30 in circuit with the grounded secondary coil 26. The filament 31 of the rectifier-tube is included in the circuit of a secondary coil 32, whose low voltage alternating current heats the filament.

A third secondary grounded coil 33 is included in a low voltage alternating-current circuit of filament 34, for heating the latter, said filament 34 forming part of an oscillator, which also includes tube 35, plate 36 and grid 38.

Included in the plate-circuit 37 is a grounded condenser 37$^b$, also a filter-choke coil 39, with grounded core 40. Circuit 37 may also include a milliammeter 41, and a grounded voltmeter 42, for making sure that the voltage is right.

The current flowing through plate-circuit 37 passes through the solenoid 11, and pulls down the core 12 against the tension of supporting spring 45. The return leg 37$^a$ of the circuit, leading from the solenoid, is connected to the middle of secondary coil 32, the positive terminal of the power-supply.

The balanced solenoid-operated valve 13 determines the amount of fuel delivered to the furnace. The air-valve 13, and its valve-plates 14, 15, together with the solenoid-core 12, co-operate with spring 45, so that the valve is kept in its maximum open position while the minimum amount of current is passing through the solenoid, as shown in Figure 1. As the flow of current through the solenoid gradually increases, the pull on the plunger 12, counteracting the spring tension, will correspondingly increase, thereby effecting a gradual closing of the valve. The quantity of fuel supplied to the furnace is in inverse proportion to the amount of current passing through the solenoid.

Since the solenoid is shown connected in series with the plate-power supply 37 of the vacuum tube 35, it is evident that the amount of current flowing through the solenoid depends entirely upon the amount consumed by vacuum tube 35.

In the grid-circuit 38 of the oscillator is a condenser 50, and a manual tuning coil 51 is shunted around a grounded variable condenser at 52. By adjustment of 52, the capacity of the condenser may be raised or lowered, and the frequency of oscillations proportionally decreased or increased. Increase in rate of oscillation involves increased consumption of electric current, and more current therefore passes through the solenoid 11, pulling down the core 12 and valve 13 in closing direction. Thus the heat of the furnace 23 may be reduced at will. It will be perceived that by an adjustment of the capacity of 52 in the opposite direction, the frequency of oscillation will be decreased, less current will be consumed, the pull of solenoid 11 will weaken, and the spring 45 will raise the core and valve 13, to admit more air to be mixed with fuel and supplied to the furnace 23. The heat of the furnace is thus manually settable or controllable.

To enable the furnace to vary its own fuel-supply and thereby regulate its own production of heat, there is provided a pyrometer-circuit 53, in which a weak current of electricity is generated by the heat of the furnace, by means of an element 54. Included in this circuit is a galvanometer 55, by means of which the strength of the current and hence the heat of the furnace may be ascertained. The tip of the galvanometer-needle 56 is bent over at 57, and preferably overlies a bowed scale 58, indicating the furnace temperature.

As an additional function, the galvanometer-needle 56 is utilized as a rotor, to co-operate with a stator, to automatically tune or effect variations in the general condenser capacity, and consequently automatic variations in the frequency of oscillation in the circuit of grid 37. For this purpose, there is associated with the condenser 52 an auxiliary condenser or tuning device, which is connected in parallel with 52 by a circuit 59, which includes the rotor or galvanometer-needle 56, and is grounded at 60. The main condenser 52 is grounded at 61.

The use of a scale is not necessary in all cases. The coil of the pyrometer will effect the tuning movement of needle 56, whether the scale is present or absent.

The groundings shown in the drawings are negative.

The stator-member of the auxiliary condenser is shown in the form of a radial arm 62, connected to 59 and 52, and having its tip bent over and forked at 63, so that the tongue-portion 57 of the galvanometer-needle (or auxiliary rotor) 56 can pass between the tines of the fork. The fork-tines act as stationary plates, and constitute the stator, auxiliary to the stator at 52, while the bent-over tongue or point 57 of the needle acts as an adjusting plate relatively to 63, and by its automatic movement produces a tuning or variation in the capacity of the auxiliary condenser 57, 63, and hence effects alteration of the frequency of the oscillations in the grid-circuit 37, with consequent alterations in the volume of current passing through the solenoid 11, thus altering the position of the air-valve 13, to vary the supply of fuel to the furnace.

The novel automatically adjustable stator arm or elctrode 62 is constructed in the form of a fork, whose tines are spaced sufficiently to allow ample clearance for the needle or rotor 56 or 57 to pass between them. The width of these tines (Figure 3) may be equal to the width of the indicating needle.

Notwithstanding its added function as a rotor, the normal movement of the novel heat-indicating needle is not impeded, and the galvanometer 55 will preferably perform its usual function, as though the described additional service had not been required.

Outside of the galvanometer-casing 55, the radial rotor-arm 62 may be connected to an adjusting arm 64, having a handle 65, whereby arm 62 may be set for any point of heat which the furnace is desired to reach and maintain. This adjustment of 62 may be attended to after the capacity of the tuning condenser has been approximately adjusted at 52. The furnace-heat will either build up or decline to the point at which 62 is set, and will there remain.

The auxiliary stator-arm 62 is so mounted concentrically with the galvanometer-needle 56 that the arm may be adjusted to any desired point in the arc described by said needle.

The indicating needle 56, together with the stator or electrode 62, may thus be regarded as constituting a small variable condenser-element, the capacity of which varies in correspondence with the change in position of the needle relatively to the electrode. The maximum capacity is attained when the entire width of the indicating needle lies within the tines of the electrode; the minimum, when the needle has receded nearly out of effective range with the electrode. Very little capacity change is realized, until the leading edge of the indicating needle enters the space determined by the tines of the electrode. From this point on, the capacity increase is very rapid, and reaches maximum when the entire width of the indicating needle is between the tines of the electrode. This narrow or restricted zone, in which the ratio of capacity change to indicator movement is very high, is an important controlling zone.

Since the electrode 62 is pivoted at 66 concentrically with needle 56 and galvanometer-coil 67, it results that 62 may be moved to any position in the arc described by the needle, and it is thus evident that the position of the controlling zone may be varied, and that any desired temperature or other condition of the apparatus may be reached automatically and there maintained.

The current consumption depends upon the frequency to which the apparatus is tuned. Tuning is accomplished by means of variable condenser 52, together with the small auxiliary variable condenser formed by the co-operation of the indicating needle and the electrode. These condensers are connected in parallel across the grid-coil 51.

When the circuit is in operation, more or less current will be consumed by the vacuum tube 35, depending upon the adjustment of the auxiliary stator 62, 63 and the position of the rotor or indicating needle 56, 57. This change in current consumption may be indicated by milliammeter 41 connected in series with the vacuum tube plate supply line 37.

After the furnace has been started in the usual manner, the power for the control circuit, which is diagrammatically indicated at the boundary line "B", is switched on at 24, the electrode 62 is adjusted for the desired temperature (say 1650 degrees F.), and the variable at condenser 52 is tuned for a value just below that at which the milliammeter 41 indicates an increase in current consumption.

If it is assumed that the control range extends over 10 degrees, the fuel-control valve 13 will remain in its maximum open position until the indicating needle 56 of the galvanometer 55 indicates a temperature of 1645 degrees. If the indicating needle advances beyond this temperature, it effects an increase in capacity in the condenser 56, 62. This causes an increase in the plate-current consumption of the vacuum tube 35. Since the solenoid 11 of the control-valve 13 is connected in series with the plate-supply 37 of the vacuum tube 35, it is apparent that the pull on its core 12 will also increase, thereby effecting a gradual closing movement of the fuel-control valve 13.

When the temperature has reached 1655 degrees, the control-valve 13 will have assumed its minimum desired position, and, since, at this position the furnace is supplied with a scarcity of fuel, the temperature must drop. As the temperature falls, the described operation reverses, the control-valve gradually reopens, and the fuel-supply increases, thereby checking the temperature drop. It is evident then that after a short time, the fluctuations of the indicating needle will cease, and it will settle in a position that will cause the control-valve continually to admit a quantity of fuel to the furnace that will just offset the latter's heat losses, thereby maintaining the temperature constant. This position of the indicating needle must therefore lie between 1645 and 1655 degrees (since at 1645 the control-valve is in its maximum position, thereby causing a rise in temperature, and at 1655 is in its minimum position, effecting a fall in temperature). The indicating needle will come to rest at 1650 degrees, which is the desired temperature in this illustration, and there remain.

In practice, even if there is some slight vibration of the needle at the start, still it promptly settles at the desired point, and remains motionless.

In instances where the indicating needle may not be a conductor of electricity, the device shown at Figure 7 is used. In this case, the tines of the adjustable electrode 62ª are insulated from one another, thereby constituting a small fixed auxiliary condenser in themselves. The indicating needle 56ª, in passing between them, varies the capacity by changing the dielectric medium of the auxiliary condenser, as will be understood.

Figures 8 and 9 show how capacity variations can be caused by a moving liquid 68. The indicating function performed by the liquid may be the same as that performed by the moving indicator in the previously-explained cases. The change is in the form of the electrode or electrodes employed. The liquid moves in an inclined adjustable glass tube 69. The stator is in the form of a collar 70. Tipping of the tube causes the mercury to flow into the collar, to increase the capacity as explained.

The invention is not limited to the described means for transforming the capacity variations produced by the movement of an indicator of an indicating instrument, into proportionate variations of electrical energy.

It will be understood that power may be derived from a battery if desired, instead of from an electric-light line, since the positive pole of the battery would be at 32 and the negative at 26.

Many other variations may be made within the scope of the invention, as for example the indicating needle may have tines, and the auxiliary stator may be in the form of a tongue to be forked by the tines. Portions of the improvements may be used without others.

Having thus described my invention, I claim:

1. The combination with a furnace having a regulator, of means for keeping the furnace constantly and steplessly at the desired temperature, with practically no temperature drift, including a galvanometer connected to respond to the furnace heat, the needle of the galvanometer forming an element of a separate electrical circuit which also includes said regulator, means being provided in said regulator circuit for causing variation in the current in response to the weak movements of the needle effected by variations in the heat of the furnace, said regulator circuit having electrically operating means responsive to such variations in the current for operating said regulator in correspondence with variations of the furnace heat, and means responsive to said regulator to control the supply of fuel to the furnace.

2. The combination of a major apparatus, a delicate regulator therefor, an indicating instrument included in an independent minor electrical circuit and movable thereby to and fro, and an independent main oscillating electrical circuit having means to enable the fluctuations of said indicating instrument to vary the capacity in the main electric oscillating circuit, and thereby vary the output power of said main circuit, and render it of sufficient intensity to cause said regulator to maintain the condition of said major apparatus steplessly at a predetermined point, said indicating instrument being electrically connected to said oscillating circuits.

3. The combination of a tube circuit; a galvanometer; means for enabling the change in position of the needle of the galvanometer to bring about frequency variation in the tube circuit; a stator co-operating with said needle to form a small variable condenser, the needle being unobstructed by the stator and so free to assume any position on the galvanometer scale; said condenser being shunted across a grid coil which is inductively related to a plate coil, so that as the indicating needle hovers in the proximity of the stator an inductive relation between the two coils is affected, a change in the anode current of the triode being effected; means, including a solenoid which is connected in series with the anode supply, for transforming the current variations into equivalent mechanical variations; and means to utilize these mechanical energy variations to control a major apparatus.

4. In combination, an oscillatory electric circuit having automatic means whereby its capacity and oscillating frequency may be varied, to effect variations in the current flow in said circuit; said circuit having means whereby minutest change in frequency automatically causes a relatively great change in current flow, and a controlling mechanism having means for utilizing such changes to bring about automatically required variations in a control power.

5. In combination, a major apparatus, an indicating instrument having a movable indicator normally stationary during the operation of said apparatus, but movable in response to changes in the condition of the apparatus, an electric circuit whose capacity is varied by movements of said indicator, whereby the flow of current in said circuit is varied, apparatus-regulating means responsive to the variations in the flow of current, said movable indicator freely hovering in proximity to an electrically charged element connected in either the grid or plate circuit of an electronic tube, thus causing variations in the amount of current flowing in the tube circuit, and an electromagnetic regulating device inserted in the tube supply circuit and operated by the current in the tube circuit.

6. The combination of a needle and fork relatively movable, an oscillator having a condenser with relatively fixed plates, said needle and fork comprising a condenser which is electrically connected to the oscillator, whereby the capacity of said oscillator may be varied by relative movement of said needle and fork, a major apparatus subject to fluctuations controllable electrically through said oscillator, a coil which causes relative movements of said needle and fork to be directly responsive to fluctuations in the condition of said major apparatus, and adjustable means for varying the zone of operation of the needle and fork, said needle-operating coil being included in an independent circuit which is affected by fluctuations in the condition of said major apparatus.

7. The combination of a major apparatus, a stator, and a voltmeter having a needle, one of said stator and voltmeter elements being forked for the passage of the other, to form an auxiliary electrical condenser, said apparatus being electrically controlled by an oscillator having a condenser with relatively fixed plates, a coil for controlling said needle, and means whereby the capacity of said oscillator may be varied through the relative movement of said needle and fork, said coil being included in an independent circuit, and said movements being responsive to changes in condition of said major apparatus affecting said independent circuit, adjustable means being provided for affording manual predetermination of the operating zone of said auxiliary condenser, said auxiliary electrical condenser being electrically connected to the oscillator.

8. In combination, an oscillator, a major apparatus to be controlled thereby, means for manually tuning the oscillator, and auxiliary means to enable said major apparatus to effect fine regulation of its own condition within a zone whose location is determinable by said manually tuning means, said auxiliary means including an auxiliary tuner for said oscillator, said auxiliary tuner being responsive to changes in the condition of said major apparatus.

9. The combination of a major controllable power output apparatus, a highly sensitive electrical device directly attached to said apparatus to be responsive to delicate changes in the condition of said apparatus, and electrical means automatically co-operative with said highly sensitive device and including both a main condenser circuit and an independent circuit, the latter including a delicate capacity regulator responsive to fluctuations in the current in the independent circuit, for proportionally and steplessly varying the condition of said apparatus, responsively to changes in the current in said independent circuit due to delicate fluctuations in the condition of said apparatus, said regulator being electrically connected to said main condenser circuit.

10. In combination, a major apparatus subject to fluctuations, a sensitive instrument including a condenser having permanently fixed plates and also including a part movable in response to said fluctuations, a co-operative stator having the form of tines to fork said movable part, and electrical means under the control of said movable part and said stator for varying the capacity of said fixed condenser and thereby regulating the condition of said major apparatus without hampering said movable part, for maintaining the condition of said major apparatus steplessly at a predetermined point.

11. The combination of an oscillator, tuning means including a manually settable condenser, and also including an independently settable auxiliary condenser, an electrically operable regulator controllable by said oscillator in response to changes in its rate, a major apparatus dominated by said regulator, and means to cause the auxiliary rotor or its equivalent to move automatically to and from its associated stator in response to changes in the condition of said major apparatus.

12. The combination of a main source of electric current, an oscillator associated therewith, an electrically operable regulator controllable by said oscillator, a major apparatus dominated by said regulator, and means for tuning said oscillator, said tuning means being connected to said major apparatus to be moved automatically to and fro in response to changes in the condition thereof.

13. The combination of a main source of electric current, an oscillator having a filament connected to said source of current, an electrically operable regulator in circuit with the plate of said oscillator and with said source of current, a tuning condenser device having a connection with said grid, a major apparatus subject to change of conditions, and means dependent upon the condition of the major apparatus for operating said tuning device to vary the condenser capacity and the rate of oscillation and thereby control the consumption of current in the plate circuit to cause said electrically operable regulator to effect corresponding regulation of said major apparatus.

14. The combination of a main source of electric current, an oscillator having a filament, plate and grid, said filament being connected to said source of current, an electrically operable regulator in circuit with said plate and said source of current, main and auxiliary condensers jointly in circuit with said grid, said auxiliary condenser including a capacity-altering member, a major apparatus, subject to change of condition, and means dependent upon the condition of the major apparatus for moving said capacity-altering member toward or from the stator part of said auxiliary condenser, whereby variations due to change of condition of the major apparatus are produced in the joint capacity of the condensers and consequently in the rate of oscillation, and consumption of current is thereby controlled in the plate circuit, and said electrically operable regulator is consequently caused to effect corresponding regulation of said major apparatus.

15. The combination of a furnace, a main source of electric current, an oscillator having a filament connected to said source of current, and also having a plate and a grid, said plate in circuit with a solenoid and also with said source of current, main and auxiliary condensers in circuit with said grid, said auxiliary condenser including a rotor or equivalent operable by a voltmeter coil to an extent dependent upon the heat of the furnace, whereby variations due to heat are produced in the joint capacity of the condensers and consequently in the rate of oscillation, and consumption of current in the plate-solenoid circuit is controlled, and means to enable the solenoid to regulate the supply of fuel to the furnace.

16. The combination with a furnace, of an electric circuit affected by the heat of the furnace and including a voltmeter coil, a transformer for connection to an electric line and having primary and secondary coils, including one secondary coil for low voltage, and also including a second secondary coil in circuit with a rectifier, and also including a third secondary coil in circuit with the filament of an oscillator having plate and grid, said plate in circuit with a solenoid and the first of said secondary circuits; means for enabling the solenoid to regulate the supply of fuel to the furnace, a main variable condenser in circuit with said grid, and an automatic auxiliary condenser including an auxiliary rotor or equivalent operated by said voltmeter coil, whereby variations in the capacity of the auxiliary condenser are produced by fluctuations in the heat of the furnace operating through the voltmeter-coil current, the frequency of oscillations in said main and auxiliary condensers being dependent upon the automatic alterations in the capacity of the combined main and auxiliary condensers, whereby the consumption of current in the plate-solenoid circuit is controlled and the supply of fuel to the furnace regulated.

17. The combination with a furnace, of means for supplying fuel to the furnace, a pyrometer for the furnace including an electric circuit, a galvanometer being included in said circuit and having a needle, means for supplying an alternating current of electricity, a transformer having primary and secondary coils for transforming the alternating current into a current of low voltage, said transformer also having a second secondary coil in circuit with a rectifier tube, said transformer also including a third secondary coil in circuit with a low voltage filament-heating circuit in an oscillator tube, said tube having a plate and grid, the plate being included in a circuit having a solenoid provided with a core, means operable by the solenoid for regulating the supply of fuel to said furnace, said plate and solenoid circuit being connected to the first of said secondary coils, the grid of said oscillator being included in a circuit with the stator of a variable condenser for increasing or decreasing the frequency of said oscillator, and an automatic auxiliary condenser stator to co-operate with said pyrometer needle, the needle serving as the rotor of the auxiliary condenser, said auxiliary condenser being in parallel with said main condenser, the movement of the needle being produced automatically by the heat of the furnace and effecting variations in the frequency of oscillations in the grid circuit, with consequent fluctuations in the volume of current flowing through the solenoid, to automatically vary the position of the fuel-valve and regulate the supply of fuel to the furnace.

18. The combination with a furnace, of means for securing stepless and proportional control thereof, including a thermo-couple, a galvanometer in circuit therewith and having a grounded needle, an electrode constructed in the form of a fork whose tines are spaced sufficiently to allow clearance for the galvanometer needle to pass freely between them, the normal movement of the needle being in no way impeded, the width of a fork tine being equal to the width of the needle, the needle together with the electrode or stator constituting a variable condenser, the capacity of which varies in correspondence with the change in the position of the needle relatively to the stator, the maximum capacity of the condenser being attained when the entire width of the needle lies between the tines of the stator, and little capacity change being realized until the leading edge of the needle enters the space between the tines, the zone of needle movement between the tines being a controlling zone, said stator being adjustable to any position in the arc of the needle, whereby the furnace controlling zone may be set to maintain any desired temperature of the furnace, a variable condenser co-operating with the aforesaid auxiliary condenser, said condensers being connected across the grid coil of an oscillator, whereby more or less current is consumed by the oscillator depending upon the adjustment of the stator and the position of the needle, and a source of power for said oscillator.

19. The combination with a furnace, of means for securing stepless and proportional control thereof, including a thermo-couple, a galvanometer in circuit therewith and having a grounded needle, an electrode constructed in the form of a fork whose tines are spaced sufficiently to allow clearance for the galvanometer needle to pass freely between them, the normal movement of the needle being in no way impeded, the width of a fork tine being equal to the width of the needle, the needle together with the electrode or stator constituting a variable condenser, the capacity of which varies in correspondence with the change in the position of the needle relatively to the stator, the maximum capacity of the condenser being attained when the entire width of the needle lies between the tines of the stator, and little capacity change being realized until the leading edge of the needle enters the space between the tines, the zone of needle movement between the tines being a controlling zone, said stator being adjustable to any position in the arc of the needle, whereby the furnace controlling zone may be set to maintain any desired temperature of the furnace, a variable condenser co-operating with the aforesaid auxiliary condenser, said condensers being connected across the grid coil of an oscillator, whereby more or less current is consumed by the oscillator depending upon the adjustment of the stator and the position of the needle, and a source of power for said oscillator, said source of power including a transformer and a rectifying tube; and a solenoid-controlled valve for controlling the amount of fuel delivered to the furnace; decrease in current capacity causing the flow of current to be augmented through the solenoid to effect a closing movement of the valve, said solenoid being connected in series with the plate power supply of the vacuum tube, so that the amount of current flowing through the solenoid depends upon the amount consumed by the vacuum tube; the fuel-control valve of the furnace remaining in its open position until the galvanometer needle advances to the point of co-operation with the adjustable stator and effects an increase in capacity in the oscillator circuit, thereby causing an increase in the plate current consumption of the vacuum tube of said oscillator, said solenoid being connected in series with the plate supply of said vacuum tube, whereby the fuel-control valve is gradually closed.

20. The combination of an indicating instrument, an electric circuit having condenser plates all constantly maintaining a fixed separation, means operated by said instrument for effecting minute variations in the capacity of said condenser, an independent electric circuit, and means co-operative with said independent circuit for transforming said variations into proportionate variations of electrical energy, for thereby steplessly maintaining the condition of a major apparatus at a predetermined point, said independent circuit having means whereby it is rendered responsive to delicate fluctuations in the condition of said major apparatus.

21. The combination with a furnace and a galvanometer having a grounded needle, an electrode settable along the path of the needle, the normal movement of the needle being in no way impeded, the needle together with the electrode or stator constituting a variable condenser, the capacity of which varies in correspondence with the change in the position of the needle in proximity to the stator, said stator being adjustable to any position in the arc of the needle, a manually variable condenser cooperating with said condenser, said condensers connected in parallel across the grid coil of an oscillator, a source of power for said oscillator including a transformer and a rectifying tube; and a solenoid-controlled valve for determining the amount of fuel delivered to the furnace, and decrease in current capacity causing the flow of current to be augmented through the solenoid to effect a closing movement of the valve, said solenoid being connected in series with the plate power supply of the vacuum tube.

22. The combination with a major apparatus, of an electric circuit affected by the condition of the apparatus and including a voltmeter coil, a transformer for connection to an electric line and having primary and secondary coils, including one secondary coil for low voltage, and also including a second secondary coil in circuit with a rectifier, and also including a third secondary coil in circuit with the filament of an oscillator having plate and grid, said plate in circuit with a solenoid and the first of said secondary circuits, means for enabling the solenoid to regulate the condition of the major apparatus, a main variable condenser in circuit with said grid, and an automatic auxiliary condenser including an auxiliary rotor or equivalent operated by said voltmeter coil, whereby variations in the capacity of the auxiliary condenser are produced by fluctuations in the condition of the major apparatus operating through the voltmeter-coil current, the frequency of oscillations in said main and auxiliary condensers being dependent upon the automatic alterations in the capacity of the combined main and auxiliary condensers, whereby the consumption of current in the plate-solenoid circuit is controlled and the major apparatus is regulated.

23. The combination with a major apparatus, of means for regulating the major apparatus, a condition-indicating device for the major apparatus including an electric circuit, a galvanometer being included in said circuit and having a needle, means for supplying an alternating current of electricity, a transformer having primary and secondary coils for transforming the alternating current into a current of low voltage, said transformer also having a second secondary coil in circuit with a rectifier tube, said transformer also including a third secondary coil in circuit with a low voltage filament-heating circuit in an oscillator tube, said tube having a plate and grid, the plate being included in a circuit having a solenoid provided with a core, means operable by the solenoid for regulating said major apparatus, said plate and solenoid circuit being connected to the first of said secondary coils, the grid of said oscillator being included in a circuit with the stator of a variable condenser for increasing or decreasing the frequency of said oscillator, and an automatic auxiliary condenser stator to co-operate with said needle, the needle serving as the rotor of the auxiliary condenser, said auxiliary condenser being in parallel with said main condenser, the movement of the needle being produced automatically by variation in the condition of the major apparatus and effecting variations in the frequency of oscillations in the grid circuit, with consequent fluctuations in the volume of current flowing through the solenoid, to automatically regulate the major apparatus.

24. The combination with a major apparatus, of means for securing stepless and proportional control thereof, including a galvanometer having a grounded needle, an electrode constructed in the form of a fork whose tines are spaced sufficiently to allow clearance for the galvanometer needle to pass freely between them, the normal movement of the needle being in no way impeded, the needle together with the electrode or stator constituting a variable condenser, the capacity of which varies in correspondence with the change in the position of the needle relatively to the stator, little capacity change being realized until the leading edge of the needle enters the space between the tines, the zone of needle movement between the tines being a controlling zone, said stator being adjustable to any position in the arc of the needle, a variable condenser co-operating with the aforesaid auxiliary condenser, said condenser being connected across the grid coil of an oscillator, whereby more or less current is consumed by the oscillator depending upon the adjustment of the stator and the position of the needle, and a source of power for said oscillator.

25. The combination with a major apparatus, of means for securing stepless and proportional control thereof, including a galvanometer having a grounded needle, an electrode constructed in the form of a fork whose tines are spaced sufficiently to allow clearance for the galvanometer needle to pass freely between them, the normal movement of the needle being in no way impeded, the needle together with the electrode or stator constituting a variable condenser, the zone of needle movement between the tines being a controlling zone, said stator being adjustable to any position in the arc of the needle, whereby the controlling zone may be set to maintain any desired condition of the major apparatus, a variable condenser co-operating with the aforesaid auxiliary condenser, said condensers being connected across the grid coil of an oscillator, whereby more or less current is consumed by the oscillator depending upon the adjustment of the stator and the position of the needle, a source of power for said oscillator, said source of power including a transformer and a rectifying tube; and a solenoid for controlling the major apparatus; decrease in current capacity causing the flow of current to be augmented through the solenoid, said solenoid being connected in series with the plate power supply of the vacuum tube, so that the amount of current flowing through the solenoid depends upon the amount consumed by the vacuum tube; the control means remaining in its fully effective position until the galvanometer needle advances to the point of co-operation with the adjustable stator and effects an increase in capacity in the oscillator circuit, thereby causing an increase in the plate current consumption of the vacuum tube of said oscillator, said solenoid being connected in series with the plate supply of said vacuum tube, whereby the control means is gradually brought to less effective position.

26. The combination with a major apparatus and a galvanometer having a grounded needle, an electrode settable along the path of the needle, the normal movement of the needle being in no way impeded, the needle together with the electrode or stator constituting a variable condenser, the capacity of which varies in correspondence with the change in the position of the needle in proximity to the stator, said stator being adjustable to any position in the arc of the needle, a manually variable condenser co-operating with said condenser, said condensers connected in parallel across the grid coil of an oscillator, a source of power for said oscillator including a transformer and a rectifying tube; and a solenoid-controlled means for regulating the major apparatus; decrease in current capacity causing the flow of current to be augmented through the solenoid to effect reduced efficiency of the major apparatus, said solenoid being connected in series with the plate power supply of the vacuum tube.

27. The combination with a furnace having a regulator, of means for keeping the furnace constantly and steplessly at the desired temperature, with practically no temperature drift, including a galvanometer connected to respond to the furnace heat, the needle of the galvanometer forming an element of a separate electrical circuit which also includes said regulator, means being provided in said regulator circuit for causing its capacity to vary in response to the weak movements of the needle effected by variations in the heat of the furnace, said regulator circuit having electrically operated means responsive to such variations in the capacity of the circuit for operating said regulator in correspondence with variations of the furnace heat, and means responsive to said regulator to control the supply of fuel to the furnace.

28. A supersensitive electrical controlling mechanism for automatically and steplessly correcting errors ascertained in the condition of a primary apparatus by the movable member of a galvanometer or other sensitive instrument, without burdening said sensitive member and thereby diminishing the sensitiveness of said instrument, said mechanism including an electrical relay circuit for the galvanometer, said relay circuit having means controlled by the condition-ascertaining movement of the sensitive member of said galvanometer, for varying the capacity of said relay circuit in proportion to the extent of condition-ascertaining movement of the galvanometer member, but without exacting appreciable energy from said sensitive galvanometer member, and an electrically controlled regulating device included in said relay circuit, for which regulating device more than sufficient output power is obtainable through said relay circuit, said regulating device being proportionally responsive to variations in the capacity of the relay circuit effected by said sensitive member, to control the condition of the primary apparatus whose condition is indicated by said galvanometer.

GEORGE A. F. MACHLET.